(12) United States Patent
Sinclair

(10) Patent No.: US 8,066,793 B2
(45) Date of Patent: Nov. 29, 2011

(54) BIO-PROCESSED MINERAL FERTILISERS INCLUDING MICRO-ELEMENTS

(75) Inventor: Clive Prebble Sinclair, Pukekohe (NZ)

(73) Assignee: Kagree Holdings Limited, Waiku (NZ)

(*) Notice: Subject to any disclaimer, the term of this patent is extended or adjusted under 35 U.S.C. 154(b) by 575 days.

(21) Appl. No.: 12/158,870

(22) PCT Filed: Dec. 21, 2006

(86) PCT No.: PCT/NZ2006/000339
§ 371 (c)(1),
(2), (4) Date: Nov. 21, 2008

(87) PCT Pub. No.: WO2007/073216
PCT Pub. Date: Jun. 28, 2007

(65) Prior Publication Data
US 2010/0107711 A1    May 6, 2010

(30) Foreign Application Priority Data
Dec. 21, 2005    (NZ) ........................ 544340

(51) Int. Cl.
*C05F 11/08*    (2006.01)
(52) U.S. Cl. ............. 71/8; 71/9; 71/10; 71/DIG. 2
(58) Field of Classification Search ............ 71/8, 9, 71/10, DIG. 2
See application file for complete search history.

(56) References Cited

U.S. PATENT DOCUMENTS

| 5,282,879 | A | * | 2/1994 | Baccarani .................... 71/10 |
| 5,994,265 | A | * | 11/1999 | Barclay et al. ............ 504/100 |
| 6,254,654 | B1 | * | 7/2001 | Van Barneveld ............ 71/8 |

FOREIGN PATENT DOCUMENTS

| CN | 1367158 | 9/2002 |
| WO | 95/06623 | 3/1995 |
| WO | 01/19940 | 3/2001 |
| WO | 2004-035508 | 4/2004 |

OTHER PUBLICATIONS

International Search Report PCT/NZ2006/000339.

* cited by examiner

*Primary Examiner* — Wayne Langel
(74) *Attorney, Agent, or Firm* — Young & Thompson

(57) ABSTRACT

Dry fertilizers of biologically degraded crushed minerals such as limestone, rock, or rock phosphate together with micro-organisms, including one or more selected supplementary trace elements, are described. Minerals, some sawdust, an inoculum, and nutrients or other protein material, including bound selected micro-elements or trace elements are stored under aerobic conditions for some weeks during thermophilic biological degradation. The resolution fertilizer releases the macro-elements and micro-elements over a long period of time. The microelements are include within a biomass of micro-organism (5-6% carbon in the resulting fertilizer) and are more effective in remedying plan or animal deficiencies than if administered as inorganic salts. Furthermore this fertilizer avoids leaching of mineral including phosphate (phosphorus) and microelements into groundwater, streams, rivers or lakes.

16 Claims, 1 Drawing Sheet

BIO-PROCESSED MINERAL FERTILISERS INCLUDING MICRO-ELEMENTS

This invention relates to fertilisers; to fertilisers that are predominantly comprised of a mineral substrate already partly decomposed by action of added micro-organisms, and to fertilisers of that type including additional stabilised micro-elements (including trace elements) added according to particular requirements as determined by on-farm measurements.

DEFINITIONS

Bio-available means, in this document, that the material so described has been brought out of an insoluble state and exists either as free inorganic or organic salts or as bound or chelated organic salts within the living material of specific micro-organisms. For example fungi are capable of transporting phosphorus laterally in the soil over some distance within their hyphae, as bound or chelated organic salts.

Bio-processed means, in this document, a process of exposing a mineral material to digestion over a period by selected micro-organisms under controlled conditions. The organisms are also provided with nutrients to assist with raising of the mass of the combined biomass. Aerobic growth conditions are preferred. The process is a controlled type of composting.

Macro-elements are for example the well known nitrogen, potassium and phosphorus (NPK). The "chemical" and often single-purpose fertilisers that include minerals and organic chemicals are well known. They are widely used in order to provide macro-elements. Examples include di-ammonium phosphate (DAP), superphosphate, "Triple Super" and other variants of superphosphate, calcium nitrate, sulphate of ammonia, potash, basic slag, elemental sulphur, sodium chloride, and urea.

Micro-elements include the well known "trace elements" (such as copper, cobalt, molybdenum, selenium, boron, zinc, manganese and perhaps others) and other elements provided in appropriate amounts including iron, sodium, calcium, potassium and magnesium; all of which have recognised biochemical functions. Such elements are often incorporated into enzymes of microbes, plants, or animals where they serve a vital role through their physico-chemical properties such as in electron transfer.

Chelates in this respect are a name for a variety of complexes or combinations of mineral ions in a mainly ionic combination with proteins or their breakdown products such as organic amines or peptides, fanning a reversible complex with a substantially neutral charge. According to the invention, proteins are often obtained from animal (fish hydrolysates) or plant (e.g. seaweed) sources and go through a strong agitation process after mixing with mineral salts, such as copper sulphate. After chelation, significant changes in the property of the mineral ions therein include: inability to react with inorganic materials, increased uptake into micro-organisms and/or plants (uptake rises from about 8% to about 40-60% in the case of copper, zinc and boron, for example), and usefully, a marked reduction in toxicity to micro-organisms. Weak carboxylic acid groups, which are also formed from degradation of proteins such as those in fish offal and waste, may be more likely to form complexes with the (relatively) alkali metals such as calcium and magnesium. Whatever their exact chemical species, the observed effect of the bonds is that the micro-elements are restrained from immediate release and are instead held back from release for weeks to months.

BACKGROUND

Single-purpose fertilisers of the "chemical" type as listed above are relatively pure chemicals, and because of hostility to life such as non-neutral pH, osmotic effects or others, life forms are substantially absent from these fertilisers as sold. There has been no particular reason to modify these fertilisers with micro-organisms. It may follow that application of at least some of these materials to the ground also brings at least short-term hostility to soil micro-organisms as well. The very low pH of superphosphate (rock phosphate treated with sulphuric acid) is one form of hostility.

For many years it has been known that some animals, or some plants, show poor thrift or restricted growth and it has been found in many cases that addition of small amounts of certain elements (many of which are in the group known as "trace elements" to the soil (or sometimes directly to the animals or plants) can overcome the problems. Boron, copper, manganese and zinc deficiencies all reduce plant dry matter and plant vigour.

Examples include: (1) Plants with yellowish leaves. In some cases this is caused by a deficiency of magnesium which is a component of the green photosynthesis protein/enzyme called chlorophyll. (2) Animals (bovines) with poor condition and a particular type of anaemia particularly if living on lands which were covered by ash showers, pumice, etc in recent eruptions in the centre of the North Island of New Zealand. These have been shown to be significantly deficient in cobalt. Similarly, copper deficiency, selenium deficiency, and many other types of deficiency in one or more elements are known. (Occasionally a deficiency to the end-user arises because of antagonism between two elements, such as copper and molybdenum, and occasionally toxic effects occur because of excessive amounts of for example copper or selenium). That such deficiencies may arise is not surprising if the total pool for a given material is limited and farmers consistently ship out plant or animal material that includes some of the pool.

There is therefore a well-developed practice of taking soil, plant or animal samples, subjecting them to appropriate chemical analysis, and providing remedial amounts of specific elements if incorrect amounts are reported, within fertilisers or in other more direct ways.

Sometimes the remedial amounts of elements (such as copper, commonly administered at about 12 kg per hectare as copper sulphate) are in themselves toxic to soil micro-organisms. Copper salts are known as a means to kill algae even at concentrations of 1 part in 40,000. In a test, copper sulphate at an amount corresponding to 1 kg/ha killed the algae in a turbid swimming pool in a few hours.

Use of soluble salts (such as copper; zinc, or cobalt sulphate) has the risk that the salts may be washed away from the sites on which they are broadcast before the micro-organisms can include them in their biomass. Clearly it would be an advantage for a user of fertiliser that any added trace elements are released from the applied fertiliser in a slow manner so that they are present for a long period (such as 12 months), whereas addition of simple salts (such as copper sulphate) that are highly soluble relies on such as adsorbtion effects against soil particles to hold the copper ions in place.

The inventor has previously supplied chelated micro-elements incorporated within a fish nutrient hydrolysate for direct application on to the ground. Although these are an improvement over inorganic salts, it has been noted that these chelates can be leached away fairly easily.

The inventor desires to invent and make fertilisers which can be broadcast without significant harm to the micro-organisms in the soil, wherein the nutrients in the fertiliser can be absorbed by at least some of the soil micro-organisms as part of their nutrients, while the trace elements which are mainly already incorporated within added micro-organisms as part of the cell structure remain in the upper layers as an enrichment, exchanged between micro-organisms, and made available to plants and then to animals.

PRIOR ART

This invention is partly based on the inventor's Patent Cooperation Treaty application published as WO2004/035508 which describes a high-temperature aerobic microbial breakdown process, supplemented with a small amount of fish offal or the like as nutrients, applied to certain mineral fertilisers such as rock phosphate. The process is applied to mixed mineral, untreated sawdust, (a cellulose-rich nutrient that becomes a void former as it is digested), micro-organisms and protein nutrients which is held in hoppers and aerated for a period of perhaps 20 to 60 days during which time metabolic activity causes the temperature to rise to over about 55-70 degrees in which thermophilic organisms can thrive but human and animal pathogens can not survive. The present invention extends the previous description to include more mineral substrates and a novel method for including effective amounts of micro-elements, since some elements (principally copper) are somewhat deleterious to micro-organisms.

OBJECT

It is an object of this invention to provide dry fertilisers including both macro-elements and micro-elements that are environmentally safe (including with respect to soil ecology), yet effective and can be used in generally sustainable agricultural systems, or at least to provide the public with a useful choice.

STATEMENT OF INVENTION

Figure 1:
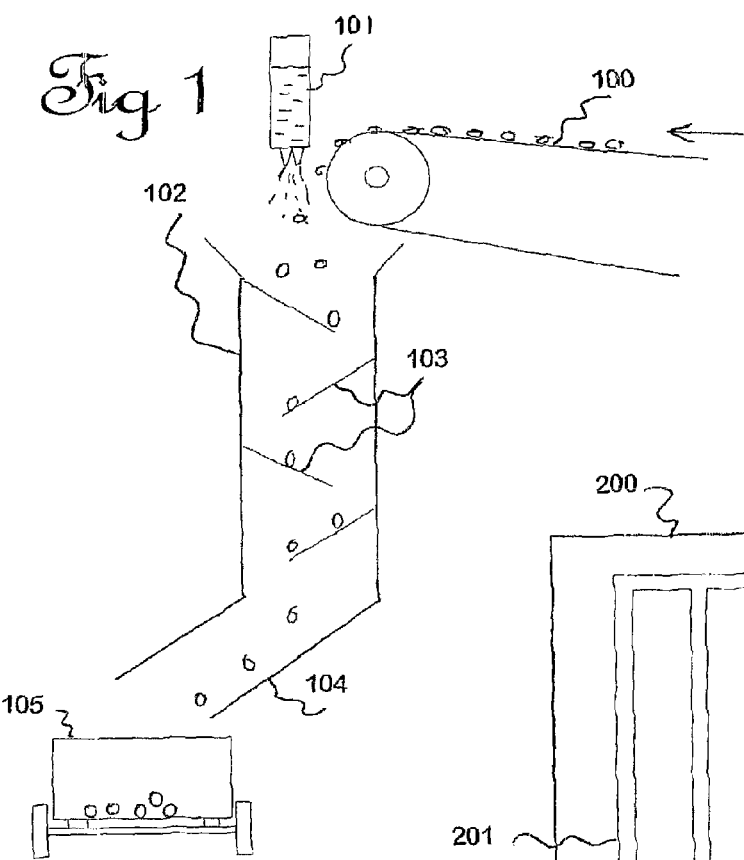
FIG. 1 is a diagram illustrating a method of making the fertilizer according to the present invention.

In a first broad aspect this invention provides a bio-processed mineral fertiliser having a dry and free-flowing physical nature, wherein the mineral fertiliser includes (a) a substantial proportion of a crushed mineral substrate, the mineral having been at least partially rendered bio-available by a composting process applied during manufacture; (b) a relatively neutral pH, (c) some organic proteinaceous matter, (d) a cellulose-rich particulate material selected from a range including sawdust, and (e) a controlled amount of one or more selected micro-elements as herein defined, wherein the or each selected micro-element is reversibly bound to, yet is only slowly releasable from, the organic matter and/or the mineral component of the fertiliser, and wherein the one or more selected micro-elements are present in a concentration that has been increased substantially beyond a natural level by purposive addition prior to the composting process.

In a first related aspect, this invention provides a process for using an analysis of the present composition of the soil and/or plant and/or animal samples taken from an area to be fertilised, in order to ascertain what supplementary minerals are to be added.

A bio-processed mineral fertiliser as previously described, in this section, wherein the mineral fertiliser includes an additional amount of at least one bound micro-element selected from the following inclusive list, in a range of approximate concentrations (expressed as dry weight by proportion) as given for each element:

copper in the range of from 5 to 20%,
potassium in the range of from 10 to 30%,
sulphur in the range of from 5 to 15%,
calcium in the range of from 20 to 40%,
magnesium in the range of from 20 to 40%,
sodium in the range of from 5 to 20%,
iron in the range of from 5 to 30%,
manganese in the range of from 5 to 20%,
zinc in the range of from 5 to 20%,
boron in the range of from 5 to 20%,
molybdenum in the range of from 2 to 10%,
cobalt in the range of from 3 to 15%,
selenium in the range of from 3 to 15%, and
iodine in the range of from 3 to 15%.

Preferably the number of included micro-elements, if present at the higher ends of their ranges, is limited to no more than 5 in any one fertiliser.

In a second broad aspect the invention provides a method for making a fertiliser generally based on a composted rock phosphate, for supplying identified micro-elements or trace elements to an environment as a supplement within the fertiliser, in which method an identified amount of the or each selected material is or are first added to a protein hydrolysate, within which the or each selected material undergoes binding including chelation, then the chelate/protein mixture is added, along with an inoculum of micro-organisms, to a mixture of a crushed mineral substrate and a cellulosic particulate material, the mixture is left to compost under aerobic conditions for a lengthy period, and then the supplemented mixture, now having passed a proportion of the micro-elements or trace elements into the biomass of the micro-organisms and having at least partially degraded the mineral substrate, is sold for application onto land.

Preferably the lengthy period is of the order of 30-70 days; more preferably 50-60 days, and preferably the period includes a thermally raised duration to a temperature of at least about 70 deg C.

Preferably the crushed mineral substrate is selected from a range of mineral fertilisers including rock phosphate, guano, zeolite, limestone, dolomite, rock (selected for crushability and potassium content).

Preferably the microelement is selected from a range including the well known "trace elements" (such as copper, cobalt, molybdenum, selenium, boron, zinc, manganese and perhaps others) also including iron, potassium, sodium, calcium and magnesium; all of which have recognised biochemical functions.

In a yet further aspect the invention provides a process for identifying the supplement to be added by means of chemical analysis of samples from the site to be fertilised, and providing a custom fertiliser including supplements in amounts capable of remedying any deficiencies indicated by the chemical analysis.

In a third broad aspect the invention comprises a method for making a bio-acceptable fertiliser that is unlikely to have an adverse effect on the soil micro-organisms in a soil being treated, despite the possible inclusion of normally toxic materials (including copper and cobalt as salts).

A method of making a bio-processed mineral fertiliser including a controlled amount of one or more selected micro-elements bound to the organic matter and/or to the mineral component of the fertiliser in a concentration increased beyond a natural level by purposive addition prior to the composting process, wherein the method includes the steps of:

a) grinding a selected mineral substrate into a particle size of about 0.5 to 3 mm mean diameter;
b) mixing sawdust, nutrients (including protein hydrolysates obtained from fish or animal offal), selected micro-organisms (including thermophilic micro-organisms), and selected micro-elements; mixed in a form selected from the range of: (i) previously adsorbed within the ground mineral substrate; (ii) as inorganic chemicals selected from the range of solutions, suspensions, powders and grains; (iii) previously mixed in the form of chelates with the protein hydrolysates; and water to a water concentration of about 20-35%;
c) holding the mixture in a container under controlled, aerated conditions for a period of time, until the mixture has exhibited a rise in temperature to at least about 70 deg C. and cooled down at least partially to ambient temperature,
d) allowing the mixture to cool, and packing the cooled mixture for sale as a substantially dry material so that it may be distributed and broadcast through conventional systems for handling dry fertiliser.

A method of making a customised bio-processed mineral fertiliser based on the method previously described, the method includes the step of previously carrying out analysis of the present composition of soil and/or plant and/or animal samples at one or more positions on a site to be fertilised, in order to indicate what supplementary mineral or minerals are required to be added to the fertiliser.

A method of avoiding a leachate of minerals including phosphate (phosphorus) and micro-elements into groundwater, streams, rivers or lakes, wherein the method includes the steps of making a chemical-rich fertiliser by (a) rendering the mineral component of the mineral substrate accessible to included microbial life forms by a composting process, and (b) rendering added minerals into an only slowly releasable state by causing said minerals to combine with included organic materials, so that (a) addition of the fertiliser permits only slow release of the minerals, and so that addition of the fertiliser does not result in inadvertent toxicity to pre-existing soil micro-organisms.

PREFERRED EMBODIMENT

The description of the invention to be provided herein is given purely by way of example and is not to be taken in any way as limiting the scope or extent of the invention.

Throughout this specification unless the text requires otherwise, the word "comprise" and variations such as "comprising" or "comprises" will be understood to imply the inclusion of a stated integer or step or group of integers or steps but not the exclusion of any other integer or step or group of integers or steps.

The invention describes a method of including micro-elements in a dry, flowable fertilisers largely comprising degraded minerals together with micro-organisms by the use of chelated microelements within the nutrients provided to the micro-organisms at the start of a composting procedure. The input minerals usually comprise limestone (calcium carbonate), zeolites, rock (in general, such as for potassium), serpentine, or rock phosphate or a combination, ground to a particle size of 0.3-0.7 mm, and used in part as a digestible substrate (which becomes partly decomposed) by the micro-organisms which are nourished with some waste protein material under thermophilic conditions for a period of some weeks. The waste protein material used as nutrients usually comprises waste from the fishing industry (about 70% by weight of a catch is not used for human consumption).

The general idea of this invention is to distribute the added micro-elements within the material and often to as high a concentration as the particular micro-element can be tolerated. The routes include (a) prior adsorbtion or chemical combination with the ground rock phosphate, (b) prior mixing with the protein-rich nutrients such as fish offal, or (c) prior mixing with the "sawdust" component, as well as bringing a stream of micro-elements to the mixing vessel for simultaneous mixing with the other components that are to become composted. Measured total amounts are used, since the products according to the invention are often designed to overcome one or more deficiencies on the soil to be treated. Issues of maximum tolerated composition, or incompatibilities between one micro-element and another, can usually be overcome by variations such as these. Not all the different possibilities have been tested as yet.

Example 1

This example relates to a fertiliser based on rock phosphate together with effective amounts of at least one desired trace element. One intention of the inventors is to supply a dry, flowable fertiliser capable of supplying a steady flow of the main mineral (phosphate ions) over a period of time and at a relatively neutral pH so that soil ecology is not adversely affected, as it would be with conventional superphosphate (which also allows a surplus of phosphate ions to be leached away readily). See the heading "Leaching" below. Another intention of the inventors is to supply a dry, flowable fertiliser including an appropriate amount of at least one micro- or trace element. The appropriate amount of macro- and micro-elements to be included in the fertiliser to be applied will have already been determined by knowledge of soil types or relevant history, or preferably as a result of carrying out chemical analysis tests on soil, plant matter, or animal samples so that elements, in particular trace elements which are deficient have been identified.

In general, the process of Example 1 can be summarised as including four steps prior to use.

Step 1: establish which elements are required for a given batch.

Step 2: make a chelated concentrate of the required element or elements.

Step 3: mix the concentrate with an inoculum of selected microbes or simply an aliquot from an older bin, and the selected mineral substrate(s).

Step 4: Follow the composting procedure that is described in the inventors' prior art document WO2004/035508 until the process has run to completion or nearly so.

Step 1 is a standard occupation of persons who sample soil and plant materials, then carry out chemical analysis for relevant materials, a process which is outside the scope of the monopoly sought by this patent application. A typical test will measure nitrogen, phosphorus (usually by the Olsen test for soluble phosphate), potassium, sulphur, calcium, magnesium, sodium, iron, zinc, copper, boron, molybdenum, cobalt, selenium and iodine, and present the results in relation to a range of acceptable results. Typically the resulting report will specify how much of a particular element should be applied per unit area of land, although amounts recommended may change as a result of the more effective formulations made according to this invention having an improved uptake by plants and an extended duration of release from plant or microbial cells.

Figure 2:
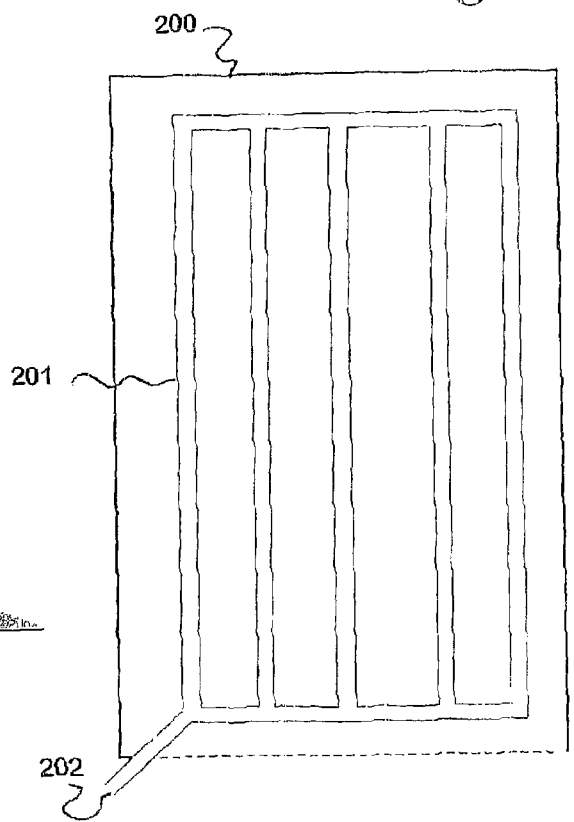
FIG. 2 is a diagram illustrating a bin for aerating the fertilizer according to the present invention.
Figure 3:
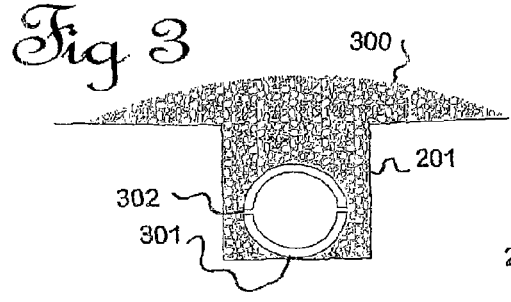
FIG. 3 is a cross-section of a perforated pipe for aerating the fertilizer according to the present invention.

Step 2 consists of the following steps:

1. Make a solution of the required amount of selected micro-element from a soluble salt thereof. (Some concern is applied at this point because of the use of a chemical material, by some proponents of pure organic farming. There does not seem to be any alternative to adding one or more chemical materials, if the micro-elements within are needed by the land on which the fertiliser is to be distributed).
2. Take a suitable amount of protein-rich liquid material such as "fish nutrient" which may be partially bacterially hydrolysed (a hydrolysate) and which is preferably acidified (typically to pH=3.5 or thereabouts) so that bacterial activity is halted yet acid hydrolysis may be continuing, and mix the solution of step 1 with the liquid material in a blender capable of providing high shear and high-speed agitation so that cellular material is at least partially broken down. A ribbon blender is one type of blender.
3. The now chelated material can be tested for the presence of effective chelation (along with some adsorbtion) by testing for free cations or anions of the micro-element. Particular amino acids (having charged portions like zwitterions) and peptides are effective chelators, but detailed characterisation of the chelates has not been done, apart from tests for remaining free ions.
4. Mix the chelate with a suspension of desired micro-organisms as previously described, which may include bacteria, thermophilic bacteria, and fungi, whether thermophilic or otherwise. (The following process is aerobic and reaches a relatively high temperature).
5. Spray the liquid over a mixture of ground mineral including about 10% sawdust (by weight) or an equivalent. (The sawdust provides a food for fungi, and when digested the resulting voids help in aeration of the resulting mass). Preferably the dry material is sprayed with nutrients, chelate and micro-organisms from a reservoir 101 while being dropped off a conveyer (100 in FIG. 1) at a steady rate into a mixing hopper (102, including internal baffles for stirring) and is then tipped (from 104) into a truck 105 and carted into an open concrete container in which the material is aerated but not stirred. As a variation the whole assembly shown in FIG. 1 may be mounted on the boom of a front-end loader; the truck 105 is not required. It is inadvisable to spill the fish nutrients from 101 onto the rubber belt of the conveyer because the belt then slips. A preferred method for aeration is shown in FIGS. 2 and 3, consisting of a series of perforated (details in FIG. 3 as 302) pipes 301 running inside grooves 201 in the floor of the concrete-walled bin 200 and covered with sawdust 300 (as in the cross-section FIG. 3) before loading the bin with material to be composted, through which pipes air is pumped from a site such as 202 at a sufficient pressure to properly aerate the mass. The lower border in the diagram is shown dotted. It may be opened for a front-end loader to access the interior. (One hopper was tested for oxygen consumption. Its internal oxygen level was 12%. After ceasing active aeration for 12 hours the oxygen level had fallen to 5%). The mass is left in place for 20 to 40 or more days, and monitored from time to time for temperature, which should rise significantly during metabolic activity. Had previous chelation not been used, the admixing of ions such as copper and cobalt with the microbes would have been likely to kill them and result in a sterile process. (For example, copper (as $Cu^{++}$) is toxic against algae in about 1:40,000 dilution.) At the same time the mass may be checked for pockets of anaerobic activity which might arise if the aeration was inadequate or faulty.

6. At the end of the process, when the temperature has fallen back to about that of the environment, the substantially dry, flowable mass can be bagged or transferred into a bulk carrier as appropriate for distribution and sale. Use the material at a suitable rate as described in the summary of step 3 above: mix the concentrate with the microbes (or their spores or other progenitors) and acidified nutrients (such as fish by-products according to WO2004/035508) then mix the resulting liquid with the selected mineral (see "Variations" below).

The resulting material to be sold and spread over land is apparently dry, and is flowable, as preferred by fertiliser manufacturers and topdressers who spread it around farms by means of trucks or topdressing aircraft. The material has a water content of perhaps 4-12% (by weight), a biomass content of about 5-6% (by weight of carbon), and is flowable. The material comprises partially solubilised and well-predigested mineral (macroelement), one or a mixture of chelated and microbially incorporated micro-element(s) and micro-organisms with spores in some cases. This material is capable of releasing both macroelement(s) and microelement(s) into the ground for an extended period yet has no adverse effects on the soil ecology.

Example 2

Copper

Taking copper as an example, it is significant that the addition of copper sulphate to a chelating material in a useful amount results in a batch of fertiliser which does not exhibit any less metabolic activity (as evidenced by oxygen consumption and temperature rise) during the thermophilic "composting" than any other batch despite the potential of unchelated copper ions to be toxic.

To Make 1,000 kg of Fertiliser (Bio Copper):

Add 100 litres of liquefied fish nutrient or hydrolysate to a known amount, typically 20-25 kg of copper sulphate (heptahydrate) and ensure that chelation has been accomplished.

Add this mixture, while also adding an inoculum of selected micro-organisms, to 900 kg of a crushed mineral substrate (limestone, rock phosphate, etc as previously described) plus 100 kg of sawdust. More sawdust may be useful.

During a 20-60 days composting bin incubation under aerobic and hot conditions (as previously described), the mixture is "bioactivated" which means that the chelated copper is largely taken into the microbial biomass (although this statement has not been confirmed at an electron microscope level such as by EDAX or similar elemental position analysis). Some parts may become intracellular, and/or it may remain adsorbed or chelated in the cell wall or an outer mucoid coat. Any remaining sawdust may adsorb some minerals. The resulting fertiliser includes 5-6% carbon.

The cooled mixture is packed for delivery in an appropriate manner as a dry fertiliser, and is broadcast over the soil in a similar way by hand, animal, or machine methods even including aircraft.

Under this system, a suitable treatment rate for copper is at from about 100 g to 5 kg per hectare. Assuming that a copper chelate including 1 kg of copper costs $1.30, the total added cost for the copper is up to $6.50 per hectare. Trials are still being carried out on the effectiveness of the lower rates of administration. The prior-art way to add copper to land in the form of copper sulphate is at 10 kilograms per hectare for which a typical charge is about twenty dollars per hectare, when mixed into a solid fertiliser.

The inventor claims that the bioactivated fertiliser is more effective and far less copper is leached out of the soil. Many publications in New Zealand have noted the difficulty in maintaining adequate copper levels in farmed animals in New Zealand. Given that direct animal treatment has disadvantages (such as three months withholding period for animals to be killed for meat), and that use of plain copper sulphate results in inferior consistency of availability, we expect that use of the plant and soil ecology to moderate the application of the copper would provide a more optimal level of copper in animals.

Formulations including other mineral additives, such as potassium, sulphur, calcium, magnesium, sodium, iron, zinc, copper, boron, molybdenum, cobalt, selenium and iodine, can be described in detail in a similar way.

Leaching

The inventor has recently received data about trials on irrigated pasture in Goulbourn, Victoria, Australia. These compared (1) control ground, (2) a bio-composted rock phosphate and (3) super-phosphate fertiliser in 8 replicates and on 8 sampling dates from 28 November to 3 February the next year for leaching of phosphate into adjacent ground water. Measured values were: average total phosphate (TP) concentrations in mg per litre of about 0.038 (steady) for the control, about 0.041 (steady) for the bio-composted form according to a previous version of this invention, and 0.79 (ranging down from 1.94 to 0.23 over time) for the superphosphate. Despite being almost indistinguishable from the control, effective amounts of phosphate are made available over time from the bio-composted rock phosphate. This confirms the inventor's theory. No data is yet available regarding leaching of added micro-elements that have been incorporated into chelates or into the actual biomass but in general one would expect a similar slow release effect.

Variations

Sources of micro-elements have to date been relatively pure chemicals, but there may be useful natural sites such as low-grade copper or other ores; using the "rock" surrounding the copper ore as a supply at least in part of other substrates.

The inventor's PCT published as WO2004/035508 already described use of a mined material known as rock phosphate as the mineral substrate, and air as an aeration gas.

Realising that the biomass content of a heap of fertiliser undergoing aerated composting rises from about 3% carbon to about 5-6% carbon, the inventor proposes to add some carbon dioxide to the aeration gas, initially doubling to quadrupling the amount naturally present, in order to provide the micro-organisms with more materials for building organic molecules. This may not be required if the mineral substrate is or includes limestone.

INDUSTRIAL APPLICABILITY AND ADVANTAGES

1. The invention detoxifies (in relation to micro-organisms, plants and animals) added minerals and trace elements comprising a fertiliser.
2. The invention provides an organic-licensed and cost-effective range of mineral additive products for farming. One benefit of its use is to build up an increased biomass of microbes in the soil, hence providing more agricultural output per hectare and incidentally providing or enhancing a carbon dioxide sink.
3. The invention provides a way to efficiently distribute micro-fertilisers on to the land. The total amount (expressed in terms of the element) of a microelement required for effective treatment is far less, when the microelement has been included into the biomass, than if the microelement was spread on the land as an inorganic salt. Further, toxic effects of direct application on soil microorganisms are absent. Release is slow and is likely to be directly from micro-organism to plant root hairs within or near the rhizosphere, so that waterways are not contaminated.
4. The invention is capable of taking care of considerable quantities of fish offal (that is, the about 70% of the original catch of a fishing vessel that is not usable as fish fillets) which is otherwise thrown over the side of the fishing vessel or dumped at a dump where it incurs penalties for being an offensive material.
5. The accompanying macro-element type fertilisers (such as calcium and phosphate-rich materials are already adapted for prolonged release, without the initial pulse of for example phosphate from an application of superphosphate; commonly more than the ground can absorb and which runs into waterways. For example, the highly acidic nature of superphosphate may be so toxic to the soil microflora and to plants that they cannot easily absorb the phosphate.
6. The macro-element type fertilisers may optionally be supplemented with micro-elements provided in a sequestered form (perhaps chelated or more commonly incorporated within the included biomass in the fertiliser) so that the micro-elements can be transferred into the soil biomass more reliably and with little leaching, and so that the level of available microelements is maintained for an extended period of time. Further, potentially toxic (if in excess) microelements are not released in a sudden pulse after application as they would be if applied as inorganic salts or even as chelates.
7. Disadvantages of liquid types of fertiliser are avoided by the use of a dry product.
8. Fertilisers made according to the invention are substantially acceptable as Inputs under the standards set by organic farming such as the BIO-GRO Organic Production Standards.

Finally, it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

We claim:

1. A bio-processed mineral fertiliser comprising:
   a crushed phosphate-rich mineral substrate, the mineral substrate having been at least partially rendered bioavailable by a composting process utilizing microorganisms;
   organic proteinaceous matter;
   cellulose-rich particulate material; and
   an effective amount of one or more selected microelements, the microelement being chelatedly bound to the organic proteinaceous matter and/or to the mineral substrate component
   wherein the fertiliser has a neutral pH, and is capable of slowly releasing the bound one or more microelements over an extended period of time after application of the fertiliser to soil, yet not exposing the composting microorganisms or existing soil microorganisms to a toxic concentration of said one or more selected microelements.

2. The bio-processed mineral fertiliser as claimed in claim 1, wherein the crushed mineral substrate is selected from the group consisting of: rock phosphate, guano, zeolite, limestone, dolomite, and rock.

3. The bio-processed mineral fertiliser as claimed in claim 1, further comprising living micro-organisms capable of converting the mineral substrate from a stored form into a bio-available form accessible by plants after application of the fertiliser to soil.

4. The bio-processed mineral fertiliser as claimed in claim 1, wherein the one or more microelement is selected at a concentration and from the group consisting of:
   a) copper in a range of from 5 to 20%,
   b) potassium in a range of from 10 to 30%,
   c) sulphur in a range of from 5 to 15%,
   d) calcium in a range of from 20 to 40%,
   e) magnesium in a range of from 20 to 40%,
   f) sodium in a range of from 5 to 20%,
   g) iron in a range of from 5 to 30%,
   h) manganese in a range of from 5 to 20%,
   i) zinc in a range of from 5 to 20%,
   j) boron in a range of from 5 to 20%,
   k) molybdenum in a range of from 2 to 10%,
   l) cobalt in a range of from 3 to 15%,
   m) selenium in a range of from 3 to 15%, and
   n) iodine in a range of from 3 to 15%,
   wherein the concentration is dry weight of the fertiliser.

5. The bio-processed mineral fertiliser as claimed in claim 1, wherein the one or more microelement is copper at a concentration of 5% by weight of the fertiliser.

6. The bio-processed mineral fertiliser as claimed in claim 1, wherein the organic proteinaceous matter is fish offal.

7. The bio-processed mineral fertiliser as claimed in claim 1, wherein the cellulose-rich particulate material comprises sawdust.

8. A method of making the bio-processed mineral fertiliser of claim 1, comprising:
   a) providing the phosphate-rich mineral substrate;
   b) mixing acidified organic proteinaceous matter, cellulose-rich particulate material, and microelements in ionic form to form a chelate;
   c) mixing the chelate from step b) with the mineral substrate of step a) and with composting microorganisms to form a mixture;
   d) allowing the mixture of step c) to compost in an aerobic environment; and
   e) packing the composted material from step d) as a substantially dry material.

9. The method of claim 8, further comprising:
   analyzing a present composition of soil and/or plant and/or animal samples at one or more positions on a site to be fertilised, and
   determining what mineral or minerals are required to be added to the fertiliser.

10. The method as claimed in claim 8, wherein the phosphate-rich mineral substrate in step a) is provided in a form of particles having a particle size of about 0.5 to 3 mm mean diameter.

11. The method as claimed in claim 8, wherein the composting step d) comprises allowing the mixture to compost in an aerobic environment while allowing a temperature of the mixture to rise, and then allowing the mixture to cool.

12. The method as claimed in claim 8, wherein the composting step d) comprises holding the mixture in a container under controlled, aerated conditions for a period of time, until the mixture has exhibited a rise in temperature of at least about 70° C. and then cooled down to about ambient temperature.

13. The method as claimed in claim 8, wherein step b) further comprises mixing water to a water concentration of about 20-35.

14. The method as claimed in claim 8, further comprising testing the chelate of step b) for substantial absence of free ions before mixing step c).

15. The method as claimed in claim 8, wherein the organic proteinaceous matter, cellulose-rich particulate material, and microelements in step b) are mixed together in a blender capable of providing high shear and high speed agitation.

16. A method of avoiding a leachate of minerals, phosphate and micro-elements into groundwater, streams, rivers or lakes, comprising the steps of malting a chemical-rich fertiliser by:
   (a) rendering a mineral substrate of the fertiliser accessible to included microbial life forms by composting the mineral substrate, and
   (b) rendering added minerals of the fertiliser into a slowly releasable state by causing said minerals to combine with organic materials included in the fertiliser, so that addition of the fertiliser to soil permits slow release of the minerals, and so that addition of the fertiliser to soil does not result in inadvertent toxicity to pre-existing soil micro-organisms.

* * * * *